US012699767B2

(12) United States Patent
Mai et al.

(10) Patent No.: US 12,699,767 B2
(45) Date of Patent: Aug. 4, 2026

(54) VIRTUALIZATION-BASED TRUSTED COMPUTING MEASUREMENT METHOD AND APPARATUS, DEVICE, AND STORAGE MEDIUM

(71) Applicant: Cloud Intelligence Assets Holding (Singapore) Private Limited, Singapore (SG)

(72) Inventors: Yufei Mai, Shanghai (CN); Fang Lu, Shanghai (CN); Su Wang, Shanghai (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 29 days.

(21) Appl. No.: 18/843,446

(22) PCT Filed: Feb. 20, 2023

(86) PCT No.: PCT/CN2023/077256
§ 371 (c)(1),
(2) Date: Sep. 3, 2024

(87) PCT Pub. No.: WO2023/165367
PCT Pub. Date: Sep. 7, 2023

(65) Prior Publication Data
US 2025/0190542 A1 Jun. 12, 2025

(30) Foreign Application Priority Data
Mar. 3, 2022 (CN) .......................... 202210202759.2

(51) Int. Cl.
*G06F 21/53* (2013.01)

(52) U.S. Cl.
CPC ........ *G06F 21/53* (2013.01); *G06F 2221/034* (2013.01)

(58) Field of Classification Search
CPC .......... G06F 21/53; G06F 21/57; G06F 9/445; G06F 9/455; G06F 21/51
See application file for complete search history.

(56) References Cited

U.S. PATENT DOCUMENTS

| | | | |
|---|---|---|---|
| 10,705,894 B2 * | 7/2020 | Jeon ...................... H04L 9/3297 |
| 2013/0347064 A1 | 12/2013 | Aissi |
| 2017/0344407 A1 * | 11/2017 | Jeon ......................... G06F 21/74 |

FOREIGN PATENT DOCUMENTS

| | | |
|---|---|---|
| CN | 112162781 A1 | 1/2021 |
| CN | 112162782 A1 | 1/2021 |
| CN | 114327791 A | 4/2022 |

OTHER PUBLICATIONS

International Search Report and English Translation, PCT/CN2023/077256, Jun. 2, 2023 (5 pages).

* cited by examiner

*Primary Examiner* — Beemnet W Dada
(74) *Attorney, Agent, or Firm* — Osha Bergman Watanabe & Burton LLP

(57) ABSTRACT

A virtualization-based trusted computing measurement method and apparatus, a device, and a storage medium. The method comprises: determining an application program to be measured; separating target measurement data from the application program, and storing the target measurement data into a virtual image file of a virtual machine, the virtual machine comprising a trusted execution environment; determining the credibility of a target virtual image file loaded to the trusted execution environment; and according to the credibility of the target virtual image file, allowing or forbidding an application program corresponding to the target virtual image file to operate in the trusted execution environment. In the embodiments of the present application, fine-grained trusted computing measurement may be per- (Continued)

formed on the application program, thereby better providing a service on the basis of the fine-grained measurement result.

13 Claims, 4 Drawing Sheets

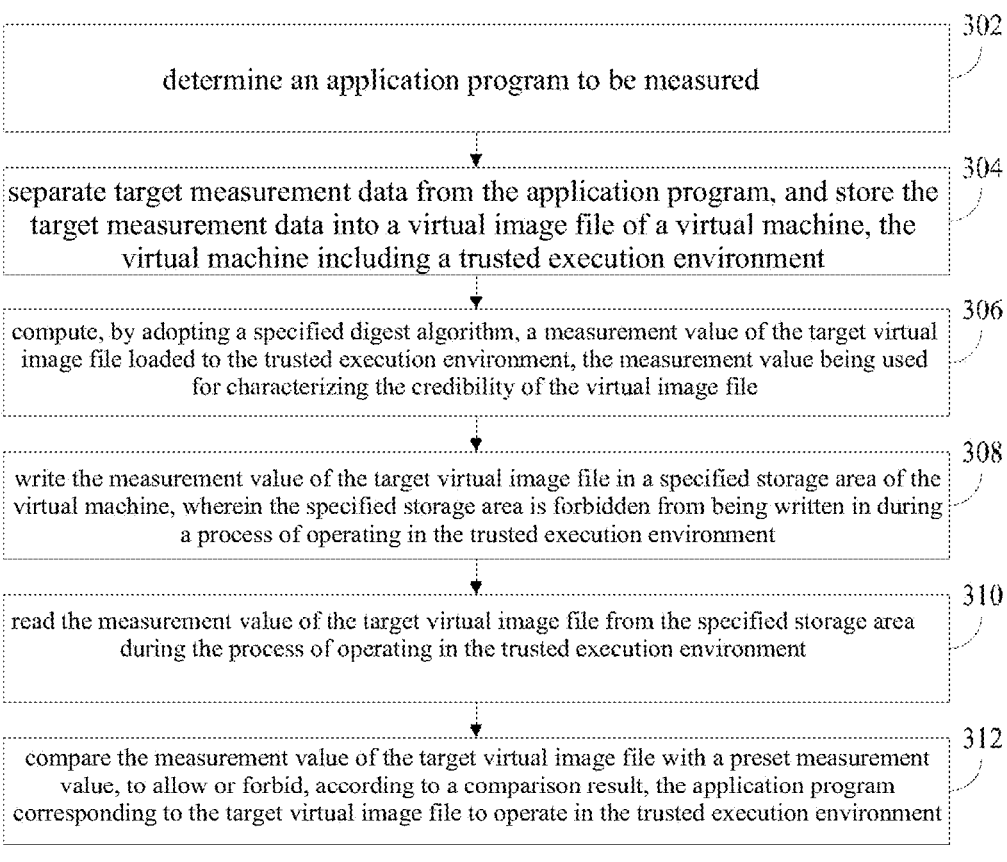

302 — determine an application program to be measured

304 — separate target measurement data from the application program, and store the target measurement data into a virtual image file of a virtual machine, the virtual machine including a trusted execution environment 306 — compute, by adopting a specified digest algorithm, a measurement value of the target virtual image file loaded to the trusted execution environment, the measurement value being used for characterizing the credibility of the virtual image file 308 — write the measurement value of the target virtual image file in a specified storage area of the virtual machine, wherein the specified storage area is forbidden from being written in during a process of operating in the trusted execution environment 310 — read the measurement value of the target virtual image file from the specified storage area during the process of operating in the trusted execution environment 312 — compare the measurement value of the target virtual image file with a preset measurement value, to allow or forbid, according to a comparison result, the application program corresponding to the target virtual image file to operate in the trusted execution environment

FIG. 3

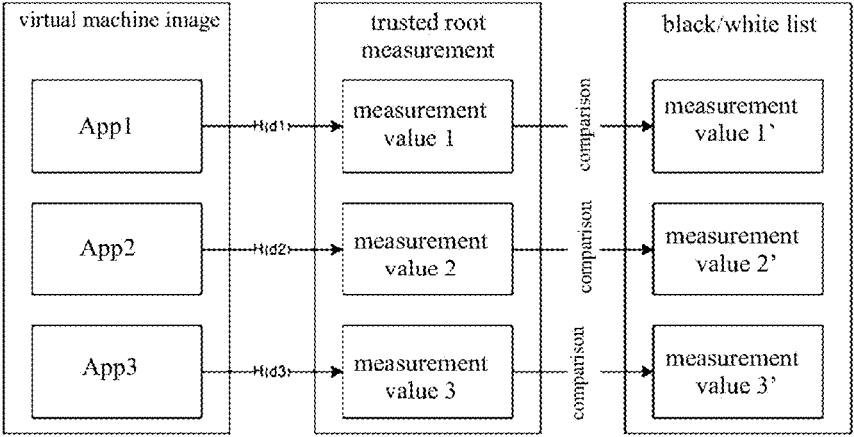

FIG. 4

VIRTUALIZATION-BASED TRUSTED COMPUTING MEASUREMENT METHOD AND APPARATUS, DEVICE, AND STORAGE MEDIUM

CROSS REFERENCE TO RELATED APPLICATION

The present application claims priority to Chinese Patent Application No. 202210202759.2, filed with the China Patent Office on Mar. 3, 2022, and titled "VIRTUALIZATION-BASED TRUSTED COMPUTING MEASUREMENT METHOD AND APPARATUS, DEVICE, AND STORAGE MEDIUM", which is incorporated herein by reference in its entirety.

TECHNICAL FIELD

Embodiments of the present application relate to the field of computer technologies, and, in particular, to a virtualization-based trusted computing measurement method and apparatus, an electronic device, and a storage medium.

BACKGROUND

Confidential computing, also known as confidential calculating/trusted computing, is to protect data in use through a hardware-based trusted execution environment (TEE). The TEE is defined as an environment that provides a certain level of data integrity, data confidentiality, and code integrity assurance.

SUMMARY

An embodiment of the present application provides a virtualization-based trusted computing measurement method.

Correspondingly, embodiments of the present application further provide a virtualization-based trusted computing measurement apparatus, an electronic device, and a storage medium, so as to ensure implementation and application of the above method.

An embodiment of the present application discloses a virtualization-based trusted computing measurement method, including:

determining an application program to be measured;

separating target measurement data from the application program, and storing the target measurement data into a virtual image file of a virtual machine, the virtual machine including a trusted execution environment;

determining a credibility of a target virtual image file loaded to the trusted execution environment; and allowing or forbidding, according to the credibility of the target virtual image file, an application program corresponding to the target virtual image file to operate in the trusted execution environment.

Optionally, the target measurement data includes a code, a configuration file, and an environment variable of the application program.

Optionally, determining the credibility of the target virtual image file loaded to the trusted execution environment includes:

computing, by adopting a specified digest algorithm, a measurement value of the target virtual image file loaded to the trusted execution environment, the measurement value being used for characterizing the credibility of the virtual image file; and writing the measurement value of the target virtual image file in a specified storage area of the virtual machine, wherein the specified storage area is forbidden from being written in during a process of operating in the trusted execution environment.

Optionally, allowing or forbidding, according to the credibility of the target virtual image file, the application program corresponding to the target virtual image file to operate in the trusted execution environment includes:

reading the measurement value of the target virtual image file from the specified storage area during the process of operating in the trusted execution environment; and comparing the measurement value of the target virtual image file with a preset measurement value, to allow or forbid, according to a comparison result, the application program corresponding to the target virtual image file to operate in the trusted execution environment.

Optionally, comparing the measurement value of the target virtual image file with the preset measurement value, to allow or forbid, according to the comparison result, the application program corresponding to the target virtual image file to operate in the trusted execution environment includes:

forbidding the application program corresponding to the target virtual image file to operate in the trusted execution environment in a case where the measurement value of the target virtual image file matches a preset measurement value in a black list; and allowing the application program corresponding to the target virtual image file to operate in the trusted execution environment in a case where the measurement value of the target virtual image file matches a preset measurement value in a white list.

Optionally, comparing the measurement value of the target virtual image file with the preset measurement value, to allow or forbid, according to the comparison result, the application program corresponding to the target virtual image file to operate in the trusted execution environment includes:

determining a service level, and obtaining, from the configuration file, a preset measurement value corresponding to the service level.

Optionally, the method further includes:

destroying the measurement value in the specified storage area in a case where operating in the trusted execution environment ends.

An embodiment of the present application further discloses a virtualization-based trusted computing measurement apparatus, including:

an application program determination module for determining an application program to be measured;

a data separation module for separating target measurement data from the application program, and storing the target measurement data into a virtual image file of a virtual machine, the virtual machine comprising a trusted execution environment;

a credibility determination module for determining a credibility of a target virtual image file loaded to the trusted execution environment; and a credibility judgment module for allowing or forbidding, according to the credibility of the target virtual image file, an application program corresponding to the target virtual image file to operate in the trusted execution environment.

Optionally, the target measurement data includes a code, a configuration file, and an environment variable of the application program.

3

Optionally, the credibility determination module is used for computing, by adopting a specified digest algorithm, a measurement value of the target virtual image file loaded to the trusted execution environment, the measurement value being used for characterizing the credibility of the virtual image file; and writing the measurement value of the target virtual image file in a specified storage area of the virtual machine, wherein the specified storage area is forbidden from being written in during a process of operating in the trusted execution environment.

Optionally, the credibility determination module is used for reading the measurement value of the target virtual image file from the specified storage area in the process of operating during the trusted execution environment; and comparing the measurement value of the target virtual image file with a preset measurement value, to allow or forbid, according to a comparison result, the application program corresponding to the target virtual image file to operate in the trusted execution environment.

Optionally, the credibility judgment module is used for forbidding the application program corresponding to the target virtual image file to operate in the trusted execution environment in a case where the measurement value of the target virtual image file matches a preset measurement value in a black list; and allowing the application program corresponding to the target virtual image file to operate in the trusted execution environment in a case where the measurement value of the target virtual image file matches a preset measurement value in a white list.

Optionally, the apparatus further includes: a service level determination module for determining a service level, and obtaining, from the configuration file, a preset measurement value corresponding to the service level.

Optionally, the apparatus further includes: a destroying module for destroying the measurement value in the specified storage area in a case where operating in the trusted execution environment ends.

An embodiment of the present application further discloses an electronic device, including: a processor; and a memory having executable codes stored thereon, which, when executed, cause the processor to execute the virtualization-based trusted computing measurement method described in one or more of the embodiments of the present application.

An embodiment of the present application further discloses one or more machine-readable media having executable codes stored thereon, which, when executed, cause the processor to execute the virtualization-based trusted computing measurement method described in one or more of the embodiments of the present application.

BRIEF DESCRIPTION OF THE DRAWINGS

FIG. 3 is a flow chart of steps of another virtualization-based trusted computing measurement method embodiment of the present application;

FIG. 4 is a schematic diagram of trusted computing measurement of a group of application programs working collaboratively in the present application;

4

Figure 6:
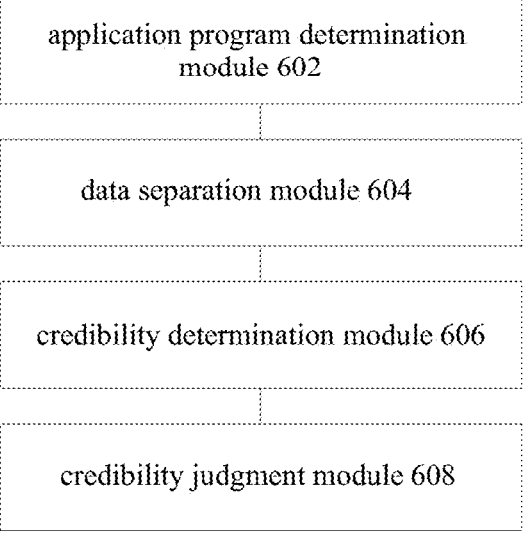
Figure 7:
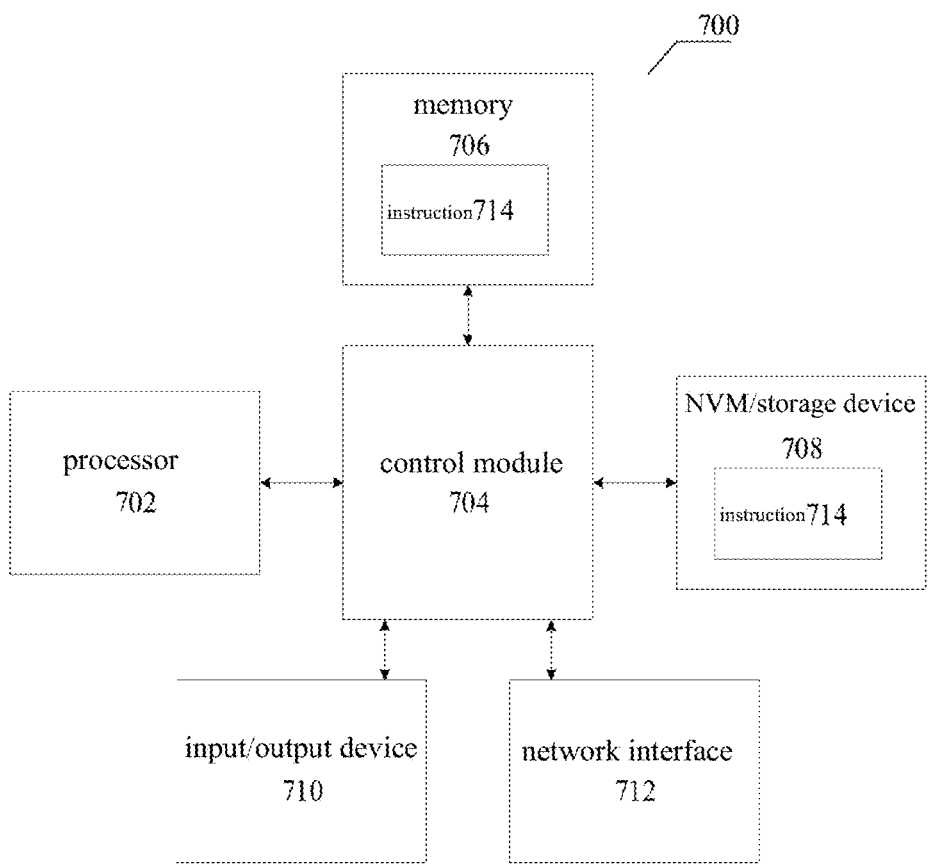

FIG. 6 is a structural block diagram of a virtualization-based trusted computing measurement apparatus embodiment of the present application; and FIG. 7 is a schematic structural diagram of an apparatus provided in an embodiment of the present application.

DETAILED DESCRIPTION

In order to make the above purposes, features and advantages of the present application more obvious and lucid, the present application will be further explained in detail below with reference to the drawings and specific implementations.

First of all, some technical terms involved in the embodiments of the present application are explained:

TEE: Trusted Execution Environment;

SEV: Secure Memory Encryption, a virtualization-based TEE technology;

TDX: Trust Domain Extensions, a virtualization-based TEE technology;

TPM: Trusted Platform Module.

In specific implementations, DataTrust (a privacy enhanced computing platform) is a security product based on a trusted execution environment, where a user imports data in an encrypted form into a data computing engine operating in TEE to execute computation, and then a calculation result is returned to the user in an encrypted form. TEE is used to protect the data computing engine to ensure that an application program is as expected and will not be tampered with due to attacks from external attackers or malicious administrators.

Typical virtualization-based confidential computing execution environment TEE technologies such as SEV and TDX utilize hardware to protect the memory used by a virtual machine when it is operating, so that no one except a user of the virtual machine can access it. Specifically, software of the virtual machine packages a system kernel, middleware, an application program, and data together to generate a virtual disk image file, and the virtual machine loads this image file after being started, and reads and writes programs and data located therein. The above technical solutions, when applied to TEE, usually cannot exert their capabilities. This is because the image file will be modified every time the virtual machine operates, and if the image file is used as a measurement object of TEE, then a measurement value of the measurement object will change at any time and be difficult to predict. Therefore, the measurement value of the image file cannot be used as a judgment basis.

In addition, there are also TPM-based solutions and Kata Containers-based solutions. In the TPM-based solutions, the measurement capability (e.g., Integrity Metrics Capability, IMA) of a TPM-based application program is to take each binary file (code) in the application program as a measurement object for measurement, and decide, according to a measurement result, whether execution is allowed, and the solutions cannot reflect the logical relationship of the measurement object. Further, in the Kata Containers-based solutions, a container runtime utilizes a virtual machine to host a container instance for operating, but it cannot provide runtime protection based on a confidential computing execution environment for the container instance.

Currently, an application program (or an application, App) can be used as a measurement object to perform trusted computing measurement, and then determine whether this application program is allowed to operate in a trusted execution environment. However, according to current technical solutions, only overall trusted computing measurement can be performed on the application program, while fine-grained trusted computing measurement cannot be performed on the application program, thereby failing to better provide a service on the basis of the application program.

In response to the above problems, an embodiment of the present application proposes a virtualized trusted computing measurement method to solve the problem that fine-grained trusted computing measurement cannot be performed on an application program. Specifically, target measurement data is separated from an application program to be measured, the target measurement data is stored as immutable data in a virtual image file of a virtual machine, and then the virtual image file of the virtual machine can be used as an invariable and predictable measurement object, thereby generating an invariable and predictable measurement value as a judgment basis for a credibility of the virtual image file, and implementing fine-grained trusted computing measurement of the application program. It should be noted that, in the embodiment of the present application, one application program may be stored to the virtual image file to perform trusted computing measurement, or a group of application programs working collaboratively may be stored to the virtual image file to perform trusted computing measurement, which is not limited herein.

Compared with the existing technology, the embodiments of the present application include the following advantages: in the embodiments of the present application, the target measurement data is separated from the application program to be measured and the target measurement data is stored into the virtual image file of the virtual machine, then the target virtual image file is loaded to the trusted execution environment of the virtual machine, and the credibility of the target virtual image file is determined, so as to allow or forbit, on the basis of the credibility, the application program corresponding to the target virtual image file to operate in the trusted execution environment. In the embodiments of the present application, fine-grained trusted computing measurement may be performed on the application program, thereby better providing a service on the basis of the fine-grained measurement result.

Figure 1:
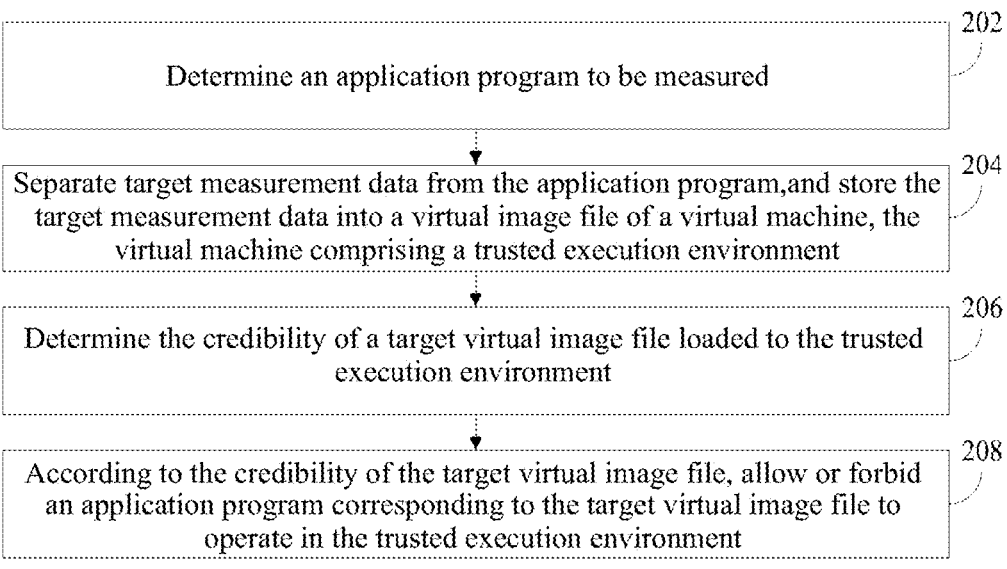
FIG. 1 is a flow chart of steps of a virtualization-based trusted computing measurement method embodiment of the present application.

Referring to FIG. 1, it is a flow chart of steps of a virtualization-based trusted computing measurement method embodiment of the present application, including the following steps:

At Step 102, determining an application program to be measured.

The application program to be measured may be one application program, or may be a group of application programs working collaboratively, which is not necessarily limited in this embodiment of the present application. For example, the application program to be measured may be one application program, such as App1, or may be a group of application programs working collaboratively, such as App1, App2, and App3.

At Step 104, separating target measurement data from the application program, and storing the target measurement data into a virtual image file of a virtual machine, the virtual machine including a trusted execution environment.

The application program usually consists of a code, a configuration file, an environment variable, and persistently stored data. The code usually refers to a machine-recognizable execution code, such as a binary executable file generated after C language compilation and a .py script written in Python language; the configuration file is usually provided in text form, and the code reads the file and parses the configuration at runtime, which will affect the code execution path; the environment variable is usually specified by the operating system or a user, which will affect the code execution path; and the persistently stored data is data stored on a hard disk or other persistent storage devices, such as a database file.

Figure 2:
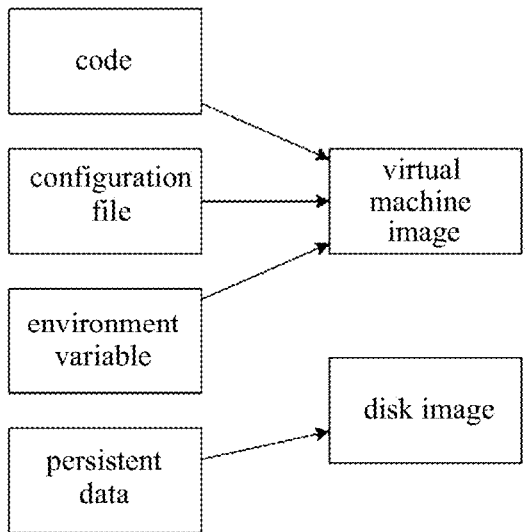
FIG. 2 is a schematic diagram of an application program packaged to an image file in the present application.

The target measurement data can include a code, a configuration file, and an environment variable of the application program. Referring to FIG. 2, it is a schematic diagram of an application program packaged to an image file in the present application. Specifically, after the code, the configuration file, the environment variable and the persistently stored data (persistent data) are separated from the application program, the code, the configuration file and the environment variable are stored into the virtual image file of the virtual machine, and the persistently stored data is stored into a disk image file of an external storage device.

In an embodiment of the present application, if the application program to be measured is a group of application programs working collaboratively, then the group of application programs working collaboratively can be packaged in an independent form to one and the same image file respectively, and surely can also be packaged respectively to generate a group of image files independent of each other, which is not limited in the embodiment of the present application.

Virtualization is a technology that allows multiple guest operating systems to simultaneously operate on one and the same machine (computer), and virtual machine is a manifestation of the virtualization. Specifically, a virtual machine refers to a complete computer system that has complete hardware system functionality and operates in a totally isolated environment through software simulation. The work that can be done in a physical computer can be implemented in a virtual machine. When a virtual machine is created on a computer, part of the hard disk and memory capacity of the physical machine needs to serve as the hard disk and memory capacity of the virtual machine. Each virtual machine has an independent CMOS, hard disk and operating system, and the virtual machine could be operated as if it were a physical machine. A trusted execution environment TEE is set in the virtual machine, and a trusted application program will be allowed to operate in the trusted execution environment TEE.

At Step 106, determining a credibility of a target virtual image file loaded to the trusted execution environment.

The credibility is used for weighing whether an application program corresponding to the virtual image file can be allowed to operate in the trusted execution environment TEE. In simple terms, if the credibility is high, then the application program will be allowed to operate in the trusted execution environment TEE, whereas if the credibility is low, then the application program will be forbidden to operate in the trusted execution environment TEE.

In an embodiment of the present application, the virtual image file of the virtual machine can be used as an invariable and predictable measurement object, thereby generating an invariable and predictable measurement value as a judgment basis for the credibility. Specifically, the target virtual image file that needs to be loaded to a memory of the trusted execution environment is determined from the virtual image file, then the target virtual image file is loaded to content of the trusted execution environment, and the credibility of the target virtual image file is determined.

At Step 108, allowing or forbidding, according to the credibility of the target virtual image file, an application program corresponding to the target virtual image file to operate in the trusted execution environment.

In an embodiment of the present application, after the credibility of the target virtual image file is determined, it will be determined, based on this credibility, whether to allow the application program corresponding to the target virtual image file to operate in the trusted execution environment.

For example, assuming that there are two application programs App1 and App2, a code, a configuration file, an environment variable and persistent storage data will be separated from App1 and App2 respectively, and then the code, the configuration file and the environment variable of App1 and App2 will be stored as target measurement data into virtual image files File1 and File2 of the virtual machine respectively, and the persistently stored data of App1, App2 will be stored into disk image files File1', File2' respectively. Assuming that a credibility of File1 based on App1 is determined to allow operating in the trusted execution environment, and a credibility of File2 based on App2 is determined to forbid operating in the trusted execution environment TEE, then after starting the trusted execution environment TEE, App1 is operated in the trusted execution environment TEE, where App1 can operate in the trusted execution environment TEE based on the data stored in File1; and during operating in the trusted execution environment TEE, if App1 needs to use the persistently stored data, such as data in a database, then desired data can be obtained from this database of File1' and used. After App1 operating in the trusted execution environment TEE ends, the persistently stored data stored in File1' can be released, and subsequently, the persistently stored data in File1' will not change.

In the above virtualization-based measurement method, the target measurement data is separated from the application program to be measured and the target measurement data is stored into the virtual image file of the virtual machine, then the target virtual image file is loaded to the trusted execution environment of the virtual machine, and the credibility of the target virtual image file is determined, so as to allow or forbit, on the basis of the credibility, the application program corresponding to the target virtual image file to operate in the trusted execution environment. In the embodiments of the present application, fine-grained trusted computing measurement may be performed on the application program, thereby better providing a service on the basis of the fine-grained measurement result.

Referring to FIG. 3, it is a flow chart of steps of another virtualization-based trusted computing measurement method embodiment of the present application, including the following steps:

At Step 302, determining an application program to be measured.

At Step 304, separating target measurement data from the application program, and storing the target measurement data into a virtual image file of a virtual machine, the virtual machine including a trusted execution environment.

At Step 306, computing, by adopting a specified digest algorithm, a measurement value of the target virtual image file loaded to the trusted execution environment, the measurement value being used for characterizing the credibility of the virtual image file.

At Step 308, writing the measurement value of the target virtual image file in a specified storage area of the virtual machine, wherein the specified storage area is forbidden from being written in during a process of operating in the trusted execution environment.

A trusted root/root of trust (RoT) is set in the trusted execution environment TEE. Specifically, a trusted root refers to a dedicated security hardware, firmware, or software component, and particular security functions can be implemented based on the trusted root. In an embodiment of the present application, a group interfaces (a specified storage area) are defined for the trusted root, and register is one of feasible implementations.

As one optional example, the specified digest algorithm can be an encryption algorithm such as a SHA256 algorithm. In an embodiment of the present application, the trusted root computes, by adopting the SHA256 algorithm, the measurement value for the target virtual image file loaded to the trusted execution environment TEE, and writes the measurement value in the interfaces. It should be noted that in a process of operating in the trusted execution environment TEE, the interfaces will become read-only and not allow for write-in until destroyed at the end of operating.

At Step 310, reading the measurement value of the target virtual image file from the specified storage area during the process of operating in the trusted execution environment.

At Step 312, comparing the measurement value of the target virtual image file with a preset measurement value, to allow or forbid, according to a comparison result, the application program corresponding to the target virtual image file to operate in the trusted execution environment.

In an embodiment of the present application, during the process of operating in the trusted execution environment, the measurement value of the target virtual image file is read from the specified storage area, and then the measurement value of the target virtual image file is compared with the preset measurement value, thereby allowing or forbidding, according to the comparison result, the application program corresponding to the target virtual image file to operate in the trusted execution environment TEE.

In an optional embodiment of the present application, the Step 312 of comparing the measurement value of the target virtual image file with the preset measurement value, to allow or forbid, according to the comparison result, the application program corresponding to the target virtual image file to operate in the trusted execution environment can include the following steps:

forbidding the application program corresponding to the target virtual image file to operate in the trusted execution environment in a case where the measurement value of the target virtual image file matches a preset measurement value in a black list; and allowing the application program corresponding to the target virtual image file to operate in the trusted execution environment in a case where the measurement value of the target virtual image file matches a preset measurement value in a white list.

In an embodiment of the present application, the credibility of the application program can be determined through a black and white list mechanism. The application program can save a measurement value of a trusted application component (target measurement data) as a preset measurement value to the white list, save a measurement value of an untrusted application component as a preset measurement value to the black list, and package the black/white list in the form of the configuration file in the image file.

For example, assuming that the measurement values of the virtual image files of the application programs App1 and App2 are App1: 123456 and App2: 56789, and the preset measurement value in the black list is Digest: 56789, since the measurement value 56789 of App2 matches the preset measurement value 56789 in the black list, then App2 with the measurement value of 56789 can be forbidden from operating in the trusted execution environment TEE.

At Step 314, destroying the measurement value in the specified storage area in a case where operating in the trusted execution environment ends.

In an embodiment of the present application, during the process of operating in the trusted execution environment TEE, the interfaces will become read-only and not allow for write-in, that is, only the measurement value therein is allowed to be read but other measurement values are not allowed to be written in, so that the measurement value in the interfaces can remain unchanged until the interfaces or the measurement value in the interfaces can be destroyed in a case where operating in the trusted execution environment TEE ends.

In an optional embodiment of the present application, prior to comparing the measurement value of the target virtual image file with the preset measurement value, to allow or forbid, according to the comparison result, the application program corresponding to the target virtual image file to operate in the trusted execution environment, the method can further include the following step:

determining a service level, and obtaining, from the configuration file, a preset measurement value corresponding to the service level.

In specific implementations, a particular service can be provided externally by abstracting one or a group of application programs, for example, an HTTP service provided by a nginx server.

In an embodiment of the present application, different service levels can be determined according to different service requirements, thereby obtaining, based on a service level, a preset measurement value corresponding to the service level from the configuration file to determine whether the application program is allowed to operate in the trusted execution environment TEE, which implements application availability guarantees for different service levels.

In order to make those skilled in the art better understand the present application, specific examples will be adopted below for explanation.

In relevant TEE technical solutions, a measurement value of a measured object is generated by utilizing a trusted root, and whether SEV or TDX can measure only one object. However, in an embodiment of the present application, a trusted root of a trusted execution environment TEE is extended, so that it can generate enough or any number of measurement results that are independent of each other. When a code, a configuration file, and an environment variable of an application program are saved to a virtual image file of a virtual machine, a system located and operating in the trusted execution environment TEE can check, according to a corresponding measurement value, whether a certain application component is tampered with or untrusted in a black or white list, so that the system can flexibly operate one maximum set of trusted applications to provide services.

In an embodiment of the present application, a segmented measurement capability is provided for the virtualization-based confidential computing technology, solving the limitation that the existing trusted execution environment TEE technologies can only measure one measurement object. Specifically, in this embodiment of the present application, in combination with an immutable virtual machine image solution, an application program operating in a trusted execution environment TEE can implement fine-grained black and white list control capabilities, and in a case where an image file of some application programs is under attack, application availability guarantees for different service levels can be implemented by detecting the trusted execution environment TEE and judging, by the system, a trusted status of the application program according to a black and while list.

A Linux IMA solution implemented based on TPM can only match each binary file, but cannot judge an associated binary file, configuration file, environment variable, and the like as a whole, and therefore, its black/white list design is very complex and difficult to use. However, in an embodiment of the present application, a container can be used to host an application program. Referring to FIG. 4, it is a schematic diagram of measurement of a group of application programs working collaboratively, that is, "App1", "App2", and "App3" illustrated in the figure represent "Container 1", "Container 2", and "Container 3", respectively, and a group of container images are packaged in a virtual machine image as an internal component, so that a group of containers operating in a virtual machine work together to provide services externally as a whole. A trusted root measurement object is a container image, and each container image is managed as an item in a black/white list, according to which, application/service can be used as a judgment basis. The embodiment of the present application can be combined with cloud virtualization Enclave for use, and the virtual machine image is operated in a protected Enclave execution environment. Compared with Kata Containers, the container instance operates in a safer environment.

Figure 5:
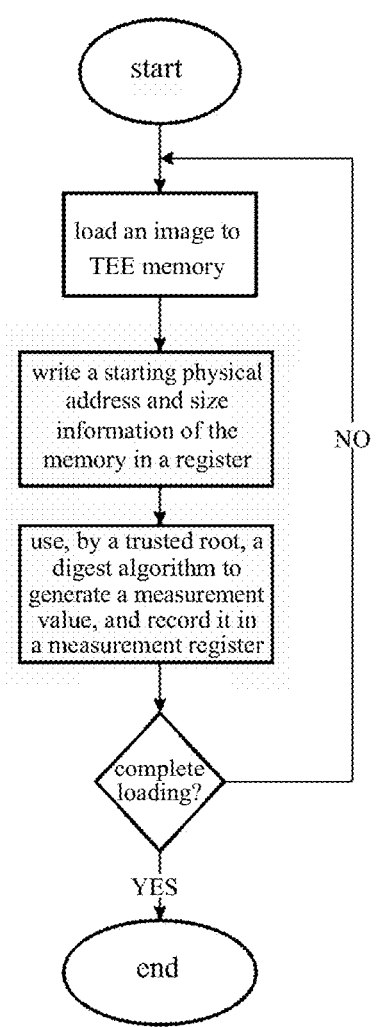
FIG. 5 is a flow chart of steps of a virtualization-based trusted computing measurement of the present application.

Referring to FIG. 5, it is a flow chart of steps of a virtualization-based trusted computing measurement of the present application. Specifically, a group of interfaces are defined for a trusted root, and register is one of feasible implementations. With this group of interfaces, a management program will load an image file in the following steps:

At Step 1, writing an image to be loaded (a target virtual image file) in a memory;

At Step 2, writing a starting physical address and size of the memory in a specified interface (e.g., Register 1), and using, by a trusted root, a specified digest algorithm (e.g., SHA256 algorithm) to generate a measurement value;

At Step 3, repeating Step 1 to Step 2 to write all image files that need to be loaded in the memory, and generate a group of measurement values corresponding to the same; and At Step 4, starting a trusted execution environment TEE, where the interfaces will become read-only and not allow for write-in until destroyed at the end of operating.

After the image files have been loaded, an application program can use measurement values of trusted application components as a white list, and measurement values of untrusted application components as a black list, and the black/white list is packaged in the image files in the form of a configuration file. During the operation of the application program, a group of measurement values generated in a loading process are read from the trusted root, and the measurement values of the internal application components are compared with the measurement values recorded by the corresponding registers. The operation will be allowed if a comparison result is in the white list, while the operation will be forbidden if the comparison result is in the black list.

Application of the embodiment of the present application has the following advantages: 1. providing a segmented measurement capability for a virtualization-based confidential execution environment; 2. providing a service-oriented trust level for applications; 3. providing runtime memory protection by operating a group of container images in a protected virtual machine; and 4. by taking a container image (an image file) as a measurement management object, simplifying management of application components whiling providing a fine-grained trusted computing measurement capability, as compared with Linux IMA solutions using TPM.

It should be noted that, for the purpose of simple description, the method embodiments are all expressed as a combination of a series of actions accordingly. However, those skilled in the art should know that the embodiments of the present application are not limited by the described action sequences, because according to the embodiments of the present application, some steps may be performed in other sequences or simultaneously. Secondly, those skilled in the art should also know that the embodiments described in the specification are all preferred embodiments, and the related actions are not necessarily required by the embodiments of the present application.

On the basis of the above embodiments, this embodiment further provides a virtualization-based trusted computing measurement apparatus, which is applied to a terminal device, a server or other electronic devices.

Referring to FIG. 6, it is shown a block diagram of a virtualization-based trusted computing measurement apparatus embodiment of the present application, which can specifically include the following modules:

an application program determination module 602 for determining an application program to be measured;

a data separation module 604 for separating target measurement data from the application program, and storing the target measurement data into a virtual image file of a virtual machine, the virtual machine comprising a trusted execution environment;

a credibility determination module 606 for determining a credibility of a target virtual image file loaded to the trusted execution environment; and a credibility judgment module 608 for allowing or forbidding, according to the credibility of the target virtual image file, an application program corresponding to the target virtual image file to operate in the trusted execution environment.

In an optional embodiment of the present application, the target measurement data includes a code, a configuration file, and an environment variable of the application program.

In an optional embodiment of the present application, the credibility determination module 606 is used for computing, by adopting a specified digest algorithm, a measurement value of the target virtual image file loaded to the trusted execution environment, the measurement value being used for characterizing the credibility of the virtual image file; and writing the measurement value of the target virtual image file in a specified storage area of the virtual machine, wherein the specified storage area is forbidden from being written in during a process of operating in the trusted execution environment.

In an optional embodiment of the present application, the credibility judgment module 608 is used for reading the measurement value of the target virtual image file from the specified storage area during the process of operating in the trusted execution environment; and comparing the measurement value of the target virtual image file with a preset measurement value, to allow or forbid, according to a comparison result, the application program corresponding to the target virtual image file to operate in the trusted execution environment.

In an optional embodiment of the present application, the credibility judgment module 608 is used for forbidding the application program corresponding to the target virtual image file to operate in the trusted execution environment in a case where the measurement value of the target virtual image file matches a preset measurement value in a black list; and allowing the application program corresponding to the target virtual image file to operate in the trusted execution environment in a case where the measurement value of the target virtual image file matches a preset measurement value in a white list.

In an optional embodiment of the present application, the apparatus further includes: a service level determination module for determining a service level, and obtaining, from the configuration file, a preset measurement value corresponding to the service level.

In an optional embodiment of the present application, the apparatus further includes: a destroying module for destroying the measurement value in the specified storage area in a case where operating in the trusted execution environment ends.

An embodiment of the present application further provides a non-volatile readable storage medium having one or more programs/executable codes stored thereon, which, when applied in a device, can cause the device to execute instructions of each method step in the embodiments of the present application.

An embodiment of the present application provides one or more machine-readable media having instructions stored thereon, which, when executed by one or more processors, cause an electronic device to execute the method described in one or more of the above embodiments. In the embodiment of the present application, the electronic device includes various types of devices such as a terminal device and a server (cluster).

The embodiments of the present disclosure may be implemented as an apparatus using any appropriate hardware, firmware, software, or any combination thereof to perform a desired configuration, and this apparatus may include a terminal device, a server (cluster), or other electronic devices. FIG. 7 schematically shows an exemplary apparatus 700 that may be used to implement various embodiments described in the present application.

For one embodiment, FIG. 7 shows an exemplary apparatus 700 having one or more processors 702, a control module (chipset) 704 coupled to at least one of the (one or more) processors 702, a memory 706 coupled to the control module 704, a non-volatile memory (NVM)/storage device 708 coupled to the control module 704, one or more input/output devices 710 coupled to the control module 704, and a network interface 712 coupled to the control module 704.

The processors 702 may include one or more single-core or multi-core processors, and the processors 702 may include any combination of general-purpose or special-purpose processors (e.g., graphics processors, application processors, baseband processors, etc.). In some embodiments, the apparatus 700 can be used as the terminal device, the server (cluster) or other devices in the embodiments of the present application.

In some embodiments, the apparatus 700 may include one or more computer-readable media (e.g., the memory 706 or the NVM/storage 708) having instructions 714, and one or more processors 702 compatible with the one or more computer-readable media and configured to execute the instructions 714 to implement modules to execute actions described in the present disclosure.

For one embodiment, the control module 704 may include any appropriate interface controller to provide any appropriate interface for at least one of the (one or more) processors 702 and/or any appropriate device or component in communication with the control module 704.

The control module 704 may include a memory controller module to provide an interface for the memory 706. The memory controller module may be a hardware module, a software module, and/or a firmware module.

The memory 706 may be used, for example, to load and store data and/or instructions 714 for the apparatus 700. For one embodiment, the memory 706 may include any appropriate volatile memory, such as appropriate DRAM. In some embodiments, the memory 706 may include a double data rate fourth synchronous dynamic random-access memory (DDR4SDRAM).

For one embodiment, the control module 704 may include one or more input/output controllers to provide an interface to the NVM/storage device 708 and the (one or more) input/output devices 710.

For example, the NVM/storage device 708 may be used to store data and/or instructions 714. The NVM/storage device 708 may include any appropriate non-volatile memory (e.g., flash memory) and/or may include any appropriate non-volatile storage device(s) (e.g., one or more hard disk drives (HDDs), one or more compact disk (CD) drives, and/or one or more digital versatile disk (DVD) drives).

The NVM/storage device 708 may comprise a storage resource that is physically part of a device on which the apparatus 700 is installed, or it may be accessed by this device without necessarily being part of this device. For example, the NVM/storage device 708 may be accessed over a network via the (one or more) input/output devices 710.

The (one or more) input/output devices 710 may provide an interface for the apparatus 700 to communicate with any other appropriate devices, the input/output devices 710 may include a communication component, an audio component, a sensor component, or the like. The network interface 712 may provide an interface for the apparatus 700 to communicate over one or more networks. The apparatus 700 may wirelessly communicate with one or more components of a wireless network according to any standard and/or protocol of one or more wireless network standards and/or protocols, for example, by accessing a wireless network based on a communication standard, such as Wi-Fi, 2G, 3G, 4G, 5G, or the like, or a combination thereof.

For one embodiment, at least one of the (one or more) processors 702 may be packaged together with logic of one or more controllers (e.g., a memory controller module) of the control module 704. For one embodiment, at least one of the (one or more) processors 702 may be packaged together with logic of one or more controllers of the control module 704 to form a system in package (SiP). For one embodiment, at least one of the (one or more) processors 702 may be integrated on one and the same die with logic of one or more controllers of the control module 704. For one embodiment, at least one of the (one or more) processors 702 may be integrated on one and the same die with logic of one or more controllers of the control module 704 to form a system on chip (SoC).

In various embodiments, the apparatus 700 may be, but is not limited to, a terminal device such as a server, a desktop computing device, or a mobile computing device (e.g., a laptop computing device, a handheld computing device, a tablet computer, a netbook, etc.). In various embodiments, the apparatus 700 may have more or fewer components and/or different architectures. For example, in some embodiments, the apparatus 700 includes one or more cameras, keyboards, liquid crystal display (LCD) screens (including touchscreen displays), non-volatile memory ports, multiple antennas, graphics chips, application specific integrated circuits (ASICs), and speakers.

In a detection apparatus, a main control chip may be adopted as a processor or a control module, sensor data, location information, or the like are stored in the memory or NVM/storage device, a sensor group may be used as an input/output device, and a communication interface may include a network interface.

For apparatus embodiments, since they are basically similar to the method embodiments, the description is relatively simple, and for relevant parts, reference can be made to some explanation of the method embodiments.

Each embodiment in this specification is described in a progressive manner, each embodiment focuses on differences from other embodiments, and the same and similar parts between the embodiments can be referred to each other.

The embodiments of the present application are described with reference to the flow charts and/or block diagrams of the methods, the terminal devices (systems), and the computer program products according to the embodiments of the present application. It should be understood that each flow and/or block in the flow charts and/or block diagrams and combinations of flows and/or blocks in the flow charts and/or block diagrams may be implemented by computer program instructions. These computer program instructions may be provided to a processor of a general-purpose computer, a special-purpose computer, an embedded processor, or other programmable virtualization-based measurement terminal devices to generate one machine, so that instructions executed by the processor of the computer or other programmable virtualization-based measurement terminal devices produce an apparatus for implementing functions specified in one or more flows of the flow charts and/or one or more blocks of the block diagrams.

These computer program instructions may also be stored in a computer-readable memory that can guide a computer or other programmable virtualization-based measurement terminal devices to work in a particular manner, so that the instructions stored in the computer-readable memory produce an article of manufacture including an instruction apparatus, and this instruction apparatus implements functions specified in one or more flows of the flow charts and/or one or more blocks of the block diagrams.

These computer program instructions may also be loaded onto a computer or other programmable virtualization-based trusted computing measurement terminal devices, so that a series of operational steps are executed on the computer or other programmable terminal devices to produce computer-implemented processing, and thereby the instructions executed on the computer or other programmable terminal devices provide steps for implementing functions specified in one or more flows of the flow charts and/or one or more blocks of the block diagrams.

Although the preferred embodiments of the embodiments of the present application have been described, those skilled in the art can make additional alterations and modifications to these embodiments once they grasp the basic inventive concept. Therefore, the appended claims are intended to be interpreted as including the preferred embodiments and all alterations and modifications falling within the scope of the embodiments of the present application.

Finally, it should be noted that relational terms such as first and second are only used herein to distinguish one entity or operation from another entity or operation, and do not necessarily require or imply that there is any actual relationship or sequence between these entities or operations. Moreover, the terms "comprise" and "include", or any other variants thereof are intended to cover non-exclusive inclusion, so that a process, method, article or terminal device that includes a series of elements not only includes those elements, but also includes other elements that are not explicitly listed, or further includes elements inherent to such process, method, article or terminal device. Without more limitations, an element defined by a statement "including one . . ." does not exclude a case where additional identical elements exist in a process, method, article or terminal device including the element.

The virtualization-based trusted computing measurement method and apparatus, the electronic device, and the storage medium provided by the present application have been introduced in detail above. The principles and implementations of the present application have been set out by applying specific examples, and the explanation of the above embodiments are only used to help understand the methods and core ideas of the present application; meanwhile, for those of ordinary skill in the art, there will be changes in the specific implementations and the application scope according to the ideas of the present application. In summary, the content of this specification should not be construed as a limitation on the present application.

What is claimed is:

1. A virtualization-based trusted computing measurement method, comprising:

determining an application program to be measured;

separating target measurement data from the application program, and storing the target measurement data into a virtual image file of a virtual machine, the virtual machine comprising a trusted execution environment;

computing, by adopting a specified digest algorithm, a measurement value of a target virtual image file loaded to the trusted execution environment, the measurement value being used for characterizing a credibility of the virtual image file;

writing the measurement value of the target virtual image file in a specified storage area of the virtual machine, wherein the specified storage area is forbidden from being written in during a process of operating in the trusted execution environment; and allowing or forbidding, according to the credibility of the target virtual image file, an application program corresponding to the target virtual image file to operate in the trusted execution environment.

2. The method according to claim 1, wherein the target measurement data comprises a code, a configuration file, and an environment variable of the application program.

3. The method according to claim 1, wherein allowing or forbidding, according to the credibility of the target virtual image file, the application program corresponding to the target virtual image file to operate in the trusted execution environment comprises:

reading the measurement value of the target virtual image file from the specified storage area during the process of operating in the trusted execution environment; and comparing the measurement value of the target virtual image file with a preset measurement value, to allow or forbid, according to a comparison result, the application program corresponding to the target virtual image file to operate in the trusted execution environment.

4. The method according to claim 3, wherein comparing the measurement value of the target virtual image file with the preset measurement value, to allow or forbid, according to the comparison result, the application program corresponding to the target virtual image file to operate in the trusted execution environment comprises:

forbidding the application program corresponding to the target virtual image file to operate in the trusted execution environment in a case where the measurement value of the target virtual image file matches a preset measurement value in a black list; and allowing the application program corresponding to the target virtual image file to operate in the trusted execution environment in a case where the measurement value of the target virtual image file matches a preset measurement value in a white list.

5. The method according to claim 3, wherein prior to comparing the measurement value of the target virtual image file with the preset measurement value, to allow or forbid, according to the comparison result, the application program corresponding to the target virtual image file to operate in the trusted execution environment, the method further comprises:

determining a service level, and obtaining, from the configuration file, a preset measurement value corresponding to the service level.

6. The method according to claim 1, further comprising:

destroying the measurement value in the specified storage area in a case where operating in the trusted execution environment ends.

7. An electronic device, comprising: a processor; and a memory having executable codes stored thereon, which cause, when executed, the processor to execute operations of:

determining an application program to be measured;

separating target measurement data from the application program, and storing the target measurement data into a virtual image file of a virtual machine, the virtual machine comprising a trusted execution environment;

computing, by adopting a specified digest algorithm, a measurement value of a target virtual image file loaded to the trusted execution environment, the measurement value being used for characterizing a credibility of the virtual image file;

writing the measurement value of the target virtual image file in a specified storage area of the virtual machine, wherein the specified storage area is forbidden from being written in during a process of operating in the trusted execution environment; and allowing or forbidding, according to the credibility of the target virtual image file, an application program corresponding to the target virtual image file to operate in the trusted execution environment.

8. One or more non-transitory machine-readable media having executable codes stored thereon, which cause, when executed, a processor to execute operations of:

determining an application program to be measured;

separating target measurement data from the application program, and storing the target measurement data into a virtual image file of a virtual machine, the virtual machine comprising a trusted execution environment;

computing, by adopting a specified digest algorithm, a measurement value of a target virtual image file loaded to the trusted execution environment, the measurement value being used for characterizing a credibility of the virtual image file;

writing the measurement value of the target virtual image file in a specified storage area of the virtual machine, wherein the specified storage area is forbidden from being written in during a process of operating in the trusted execution environment; and allowing or forbidding, according to the credibility of the target virtual image file, an application program corresponding to the target virtual image file to operate in the trusted execution environment.

9. The electronic device according to claim 7, wherein the target measurement data comprises a code, a configuration file, and an environment variable of the application program.

10. The electronic device according to claim 7, wherein the operation of allowing or forbidding, according to the credibility of the target virtual image file, the application program corresponding to the target virtual image file to operate in the trusted execution environment comprises:

reading the measurement value of the target virtual image file from the specified storage area during the process of operating in the trusted execution environment; and comparing the measurement value of the target virtual image file with a preset measurement value, to allow or forbid, according to a comparison result, the application program corresponding to the target virtual image file to operate in the trusted execution environment.

11. The electronic device according to claim 10, wherein the operation of comparing the measurement value of the target virtual image file with the preset measurement value, to allow or forbid, according to the comparison result, the application program corresponding to the target virtual image file to operate in the trusted execution environment comprises:

forbidding the application program corresponding to the target virtual image file to operate in the trusted execution environment in a case where the measurement value of the target virtual image file matches a preset measurement value in a black list; and allowing the application program corresponding to the target virtual image file to operate in the trusted execution environment in a case where the measurement value of the target virtual image file matches a preset measurement value in a white list.

12. The electronic device according to claim 10, wherein prior to the operation of comparing the measurement value of the target virtual image file with the preset measurement value, to allow or forbid, according to the comparison result, the application program corresponding to the target virtual image file to operate in the trusted execution environment, the executable codes further cause, when executed, the processor to execute operations of:

determining a service level, and obtaining, from the configuration file, a preset measurement value corresponding to the service level.

13. The electronic device according to claim 7, wherein the executable codes further cause, when executed, the processor to execute operations of:

destroying the measurement value in the specified storage area in a case where operating in the trusted execution environment ends.

* * * * *